United States Patent [19]

Ordu

[11] Patent Number: 4,572,260
[45] Date of Patent: Feb. 25, 1986

[54] VEHICLE WHEEL WITH INTERNALLY LOCATED EMERGENCY WHEEL

[75] Inventor: Armin Ordu, Schorndorf, Fed. Rep. of Germany

[73] Assignee: Daimler-Benz Aktiengesellschaft, Stuttgart, Fed. Rep. of Germany

[21] Appl. No.: 620,726

[22] Filed: Jun. 14, 1984

[30] Foreign Application Priority Data

Jun. 20, 1983 [DE] Fed. Rep. of Germany ....... 3322097
Feb. 18, 1984 [DE] Fed. Rep. of Germany ....... 3405970

[51] Int. Cl.⁴ .............................................. B60C 17/04
[52] U.S. Cl. .................................. 152/158; 152/386; 152/520
[58] Field of Search ......... 152/158, 152, 155, 330 RF, 152/386, 396; 301/38 R, 97, 98

[56] References Cited

U.S. PATENT DOCUMENTS

| 3,141,490 | 7/1964 | Lindley | 152/158 |
| 3,142,326 | 7/1964 | Lindley | 152/158 |
| 3,777,797 | 12/1973 | Anderson | 152/158 |

FOREIGN PATENT DOCUMENTS

| 1480805 | 9/1969 | Fed. Rep. of Germany . |
| 972397 | 2/1962 | United Kingdom . |

Primary Examiner—Edward Kimlin
Assistant Examiner—Thomas Bokan
Attorney, Agent, or Firm—Barnes & Thornburg

[57] ABSTRACT

The invention relates to a vehicle wheel with internally located emergency wheel, which is composed of a plurality of segments, preferably four segments. The segments have a substantially double T-shaped cross-section. Each segment is clamped in the well-base channel of the wheel rim by means of two clamp screws. In order to facilitate assembly of the emergency wheel, a clear space kept totally free from other installations is provided between the segments and the tire beads supported at the wheel rim. This space permits easy alignability and mobility of the segment pieces in the circumferential direction. Axial grooves on the radial inner sides of the segments, at an interval corresponding approximately to the diameter of the clamp screws, permits the circumferential alignment of the segments during the assembly by means of a screwdriver or the like. The segments are fastened with two screws each. All of the screw are distributed uniformly on the circumference in the fully assembled emergency wheel, thus the displacement distances of the segments in the circumferential direction for proper alignment with a set of holes in the rim is relatively small. A relieved countersunk section at the screw threaded bores permits a reliable mechanical retention of a sealing ring and the screws, and a comfortable and damage-free introduction of same into the sealing position before the assembly of the segments in the tire or the rim.

11 Claims, 3 Drawing Figures

VEHICLE WHEEL WITH INTERNALLY LOCATED EMERGENCY WHEEL

BACKGROUND AND SUMMARY OF THE INVENTION

This invention relates to a vehicle wheel with an internally located emergency wheel and more particularly to emergency wheels that are cheaper and easier to manufacture and that provide greater stability when in use than is the case in the previously known emergency wheels.

Emergency wheels are known. See for instance German Utility Model No. 1,950,530. Such a wheel includes a gas-filled tubeless rubber tire mounted on a well-based (deep channelled) rim with an annular emergency wheel composed of segments, the segments being clamped on the rim by means of screws radially penetrating the rim, the segments of which are further constructed from cast light metal which is substantially double T-shaped in cross-section with a narrow segment foot located radially adjacent the well center of the rim and with a wide segment head stiffened by radial ribs. The radially inner region of each of the respective segments is narrower axially by at least half the tire bead width than the clear interval between the tire beads. In spite of the relatively narrow configuration thereof, the segment foot is braced against the inner edges of the tire beads through the use of clamp springs which are constructed in the manner of spreading springs that spread themselves between the tire beads by cooperation with wedge surfaces of the segments when the segments are tightened radially. By this means, the segments are intended to be stabilized between the lateral beads of the tire and aligned in a precise position at right angles to the axis in case the emergency wheel must come into use. Additionally, the tire bead is intended to be retained in secure axial contact with the clinch by the spreading springs after the pressure of the tire is relaxed.

This emergency wheel has various disadvantages; principally, the assembly is highly complicated because the segment fitted with the spreading springs cannot immediately be drawn in radially between the tire beads. It may be noted that the clear interval of the tire beads in the pressureless state of the tire, such as would exist during the assembly of the emergency wheel, is smaller than the axial interval of the two ends of the spreading springs in the relaxed state. It would therefore be necessary, in order to assemble this emergency wheel, to stick the tire beads to the clinches. This is only possible when the tire is inflated, for which purpose the screw passage holes would have to be sealed prior to inflation in the case of segments located loosely inside the tire, which is likewise highly complicated. The sealing between the fastening screw of the segment, which must be introduced subsequently, and the rim is effected on the introduction side of the screw in the form of a sealing washer placed beneath the screw head, which facilitates the assembly. However, if a yielding sealing washer is used, this causes the clamping force of the fastening screw to be inadmissibly restricted. In an emergency the fastening screws of the emergency wheel are stressed to the same degree as the wheel fastening screws. However, a non-yielding sealing washer using an inserted soft-sealing ring which must be used in such emergency wheels to prevent leakage would inevitably have large dimensions, both in diameter and also in the axial direction, so it would no longer be possible to accommodate such a sealing washer in the narrow remaining radial gap between the inside of the rim and the brake drum. The sealing between screw and rim should therefore be effected on the contact side of the segments for space considerations, however, this again raises assembly problems. Another disadvantage of this emergency wheel from the assembly standpoint is the absence of any possibility of maneuvering the segments into the correct circumferential position; it must be remembered that all the segments which together form a full ring are at first arranged loosely inside the tire and spread themselves about the tire where their random relative circumferential position is not detectable. The required sliding distances of the segments into a correct circumferential position are also relatively great. All this renders the assembly of the known emergency wheels so complicated and so time-consuming that practical manufacturing operations have hitherto, except for compelling exceptions, resisted any introduction of emergency wheels.

An object of this invention is to eliminate these above-noted and other disadvantages and to improve the emergency wheel configuration so that it can be assembled easily and with an acceptable time outlay.

This object is achieved according to the invention by providing an emergency wheel in which the radially inner region of each segment and the tire beads define between them a space. The emergency wheel according to preferred embodiments of the invention includes two clamp screws for cooperative engagement with each segment communicating with the segment through passage holes provided in the rim. The passage holes are uniformly spaced around the circumference of the rim, sealing means for providing an airtight seal between the rim and clamp screws on the segment contact side of the rim are provided which include a loop-ring seal formed of rubber elastic material and are positioned in a radially outwardly, relative to the wheel, conical countersink of the segment. The countersink has a relief for retaining the loop-ring such that it overlaps radially inwardly.

Also in preferred embodiments of the wheel of the present invention it is provided that the inside of each segment foot has on its entire circumference outside the region of the screwthreaded bore, axially oriented grooves the mutual interval of which is equal to or less than the diameter of the passage holes.

Since the space between tire bead and segment foot in the present invention is kept totally free of installations, and particularly contains no spreading springs as in known safety wheel configurations, not only is the highly complicated sticking of the tire beads to the clinches made superfluous, but the segments can also be displaced in the circumferential direction without great resistance even in the relaxed state of the tire. At least the segment located respectively at the top can readily abut the rim with its segment foot sole. The necessary sliding distance for a circumferentially correct adjustment of the segments is greatly reduced by the double screwing of each segment and the uniform screw pitch. In the case of four segments, the maximum displacement correction for each segment in the least favorable case is 22.5°.

By virtue of the relief in the region of the countersunk section accommodating the sealing ring, the latter can be inserted easily and retained securely therein, so that no assembly problems whatsoever arise in this respect. The axial grooves permit a reliable levering onward of the segments in the circumferential direction with a screwdriver though one of the screw passage holes. Particulrly, the one-sided bevelling of the groove flanks permits a positive mechanical detection of the circumferential direction in which the segment can be levered on by the shortest route to a suitable circumferential position. The overall assembly time can be reduced to approximately 10 minutes by the measures according to the invention; that is to say, the assembly of a tire including the emergency wheel according to the invention takes an experienced operator only approximately 5 minutes longer than a plain tire assembly of the same size.

The axial clearance on both sides between the segments and the tire beads also permits, in the case of an emergency run, an axial lifting of the tire beads from the clinches and shoulders of the rim, so that the slip between wheel and tire which occurs during emergency running occurs at this relatively lightly stressed point, but not in the region of the highly-stressed contact between emergency wheel and inside of the wheel tire. The rubber wear is consequently much less, which produces quieter running of the emergency wheel and a longer distance which can be covered in an emergency. The increase in the number of screw positions also stabilizes the individual segments radially and axially irrespective of the rim clinches and/or of the tire beads, so that quiet emergency running can be ensured even in the case of a lateral stressing of the emergency wheel.

Further objects, features, and advantages of the present invention will become more apparent from the following description when taken with the accompanying drawings which show, for purposes of illustration only, an embodiment in accordance with the present invention.

DETAILED DESCRIPTION OF THE DRAWINGS

Figure 1:
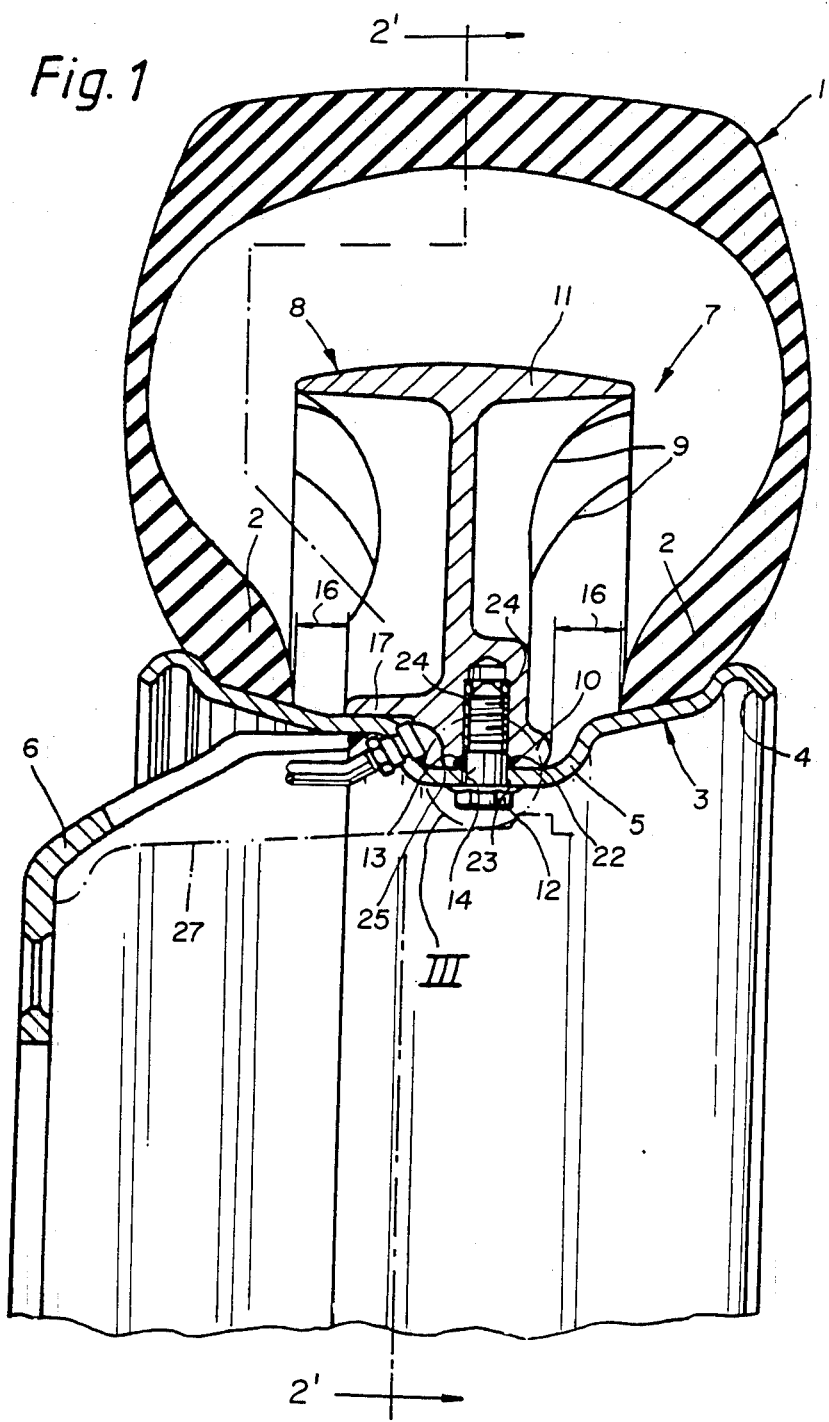
FIG. 1 is a cross-sectional view through a vehicle wheel with internally located emergency wheel constructed in accordance with a preferred embodiment of the invention.

The vehicle wheel illustrated in the drawings exhibits a rubber tire 1 with tire beads 2, which is mounted on a deep channelled rim 3 with clinches 4. Due to the internally located emergency wheel 7, the rubber tire has to dispense with a tube; the rim must therefore be closed air-tightly. On the left-hand side of the vehicle wheel in FIG. 1, a wheel dish 6 has been welded to the rim, which dictates the well-base channel 5 being located axially eccentrically in the well-base rim, so that one long and one short rim shoulder are produced. The contour of the associated brake drum 27 is also indicated by chain-dotted lines in FIG. 1.

The emergency wheel 7 already referred to, which consists of four segments 8 in the exemplary embodiment illustrated, is arranged inside the air-filled rubber tire. The individual segments have substantially a double T-shaped cross-section with a relatively narrow segment foot 10 and a wider segment head 11. In fact, the width of the segment head is approximately as great as the clear interval between the tire beads in the case of correct contact with rim clinches. The segments are also stiffened on both sides with a plurality of radially oriented stiffening ribs 9. The segment foot 10 is clamped to the well-base channel 5 at the radial inside of the segment by means of clamp screws 12. For this purpose the passage bores 14 are sealed air-tightly against the respective shanks of the clamp screws 12 by means of a loop-ring seal element 13 of rubber elastic material. Two screw-in eyes, each with a screwthreaded bore 24 to receive the clamp screws, and a radially outwardly conical countersunk section to receive the loop-ring seal element 13, are provided in the region of the segment foot for each segment. From considerations of wear the screwthread is formed by a screw-in, so-called helical screw insert, so that frequent slackening and retightening of the screw attachments under high loads is possible despite the segments being produced from cast aluminum.

Figure 3:
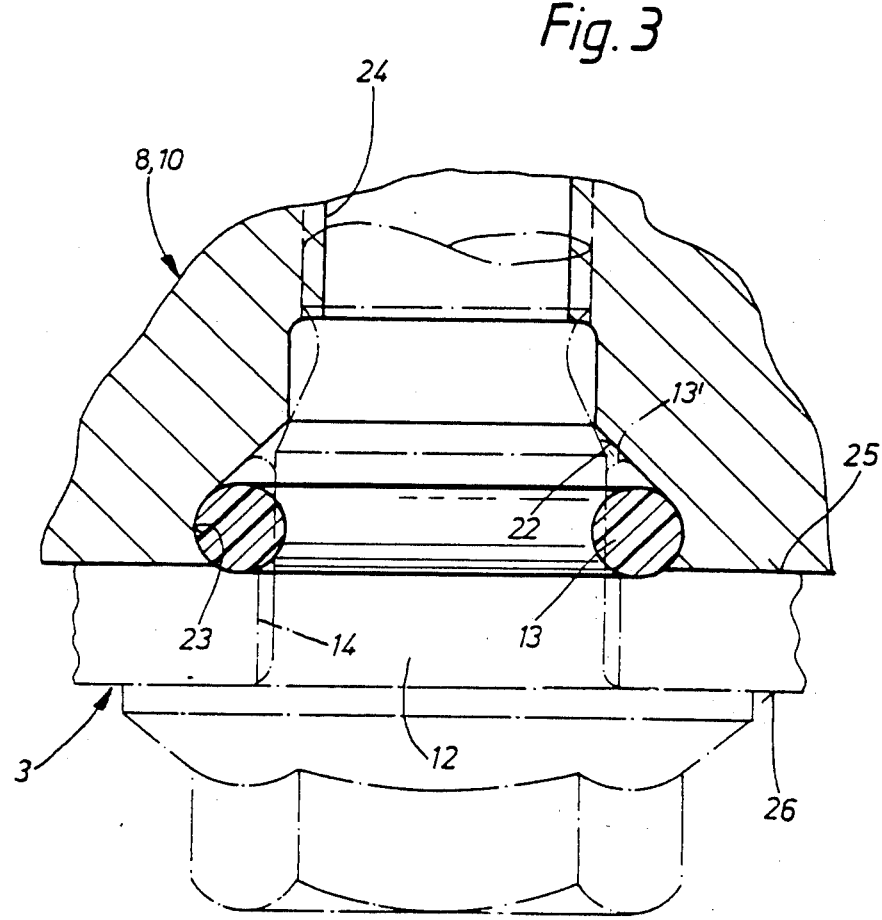
FIG. 3 is a detailed sectional view on a larger scale showing the detail III in FIGS. 1 and 2.

Referring to FIG. 3, in order to be able to insert the loop-ring seal elements 13 into the countersunk bore sections 22 and to retain them there securely before the segments are assembled, a relief section 23 is formed at the outer edge of the countersunk section 22. In the relaxed state of the seal elements 13 shown by solid lines in FIG. 3, the relief sections engage around the same at all parts of their circumference with slight pre-stress and without air bubbles and with the countersunk section 22 making the sealing elements 13 overlap axially at all parts of its circumference by a sufficient amount for reliable sealing. The loop-ring seal element 13 can easily be inserted there, for example pressed in, and then has such a high pre-stress that it adheres well to the wall of the relief 23 even without adhesive. Additionally the seal element 13 cannot slip out of the relief during necessary circumferential displacements of the emergency segments on the rim in the interior of the tire because of friction between seal element and the rim well-base channel. Because of the ease of this operation, considerable assembly time is saved since the time-consuming and complicated introduction and fixing of the seal elements through the passage bore as must be done in other wheels is avoided.

The introduction of the seal element through the bore was normally done with long tools which led to undetected damage to the sealing rings. The assembly of the tire of the present invention permits operator observation of seal installation thus preventing undetected damage to the seals. The retention of the seals 13 according to the invention has other important benefits in that it prevents any skewing of the sealing rings in the screw threaded bore, it minimizes faults in the introduction and screwing-in of the fastening screw, and it reduces loss of the sealing ring by slipping out of the countersunk section into the interior of the tire where it might obstruct correct assembly and contact of the segments. The dimensional tolerances of the loop-ring 13, of the countersunk section 22, of the relief section 23, and of the shank of the clamp screws 12 can be taken up by a space 13' reserved in the region of the conical countersunk section 22; the contour of this space 13' being indicated by chain-dotted lines in FIG. 3.

FIG. 1 illustrates the contour of the brake drum 27 associated with the vehicle wheel, which shows that little to no installation space is available for sealing the screw passage on the screw introduction side 26 of the rim, so that the sealing must therefore be effected on the segment contact side 25 of the rim, that is to say inside the tire.

To permit the individual segments with their relatively complicated structure to be produced relatively simply, and to permit them to be shaped easily, the individual segments 8 are made of cast aluminum according to especially preferred embodiments. Consequently the mass of the wheel is increased only relatively slightly by the addition of the emergency wheel, which also benefits the springing comfort of the vehicle both during normal service and also during emergency running; resulting in quiet emergency service.

Due to the relatively small width of the segment foot 10 compared to the clear interval of the tire beads 2, a lateral space 16 (FIG. 1) is created on both sides which is kept totally free of installations in the emergency wheel assembly according to the invention. Consequently, in the case of emergency running, the tire beads 2 can slip down axially from the rim shoulders, so that slippage between wheel and tire which is dictated by emergency running can occur at this point.

Figure 2:
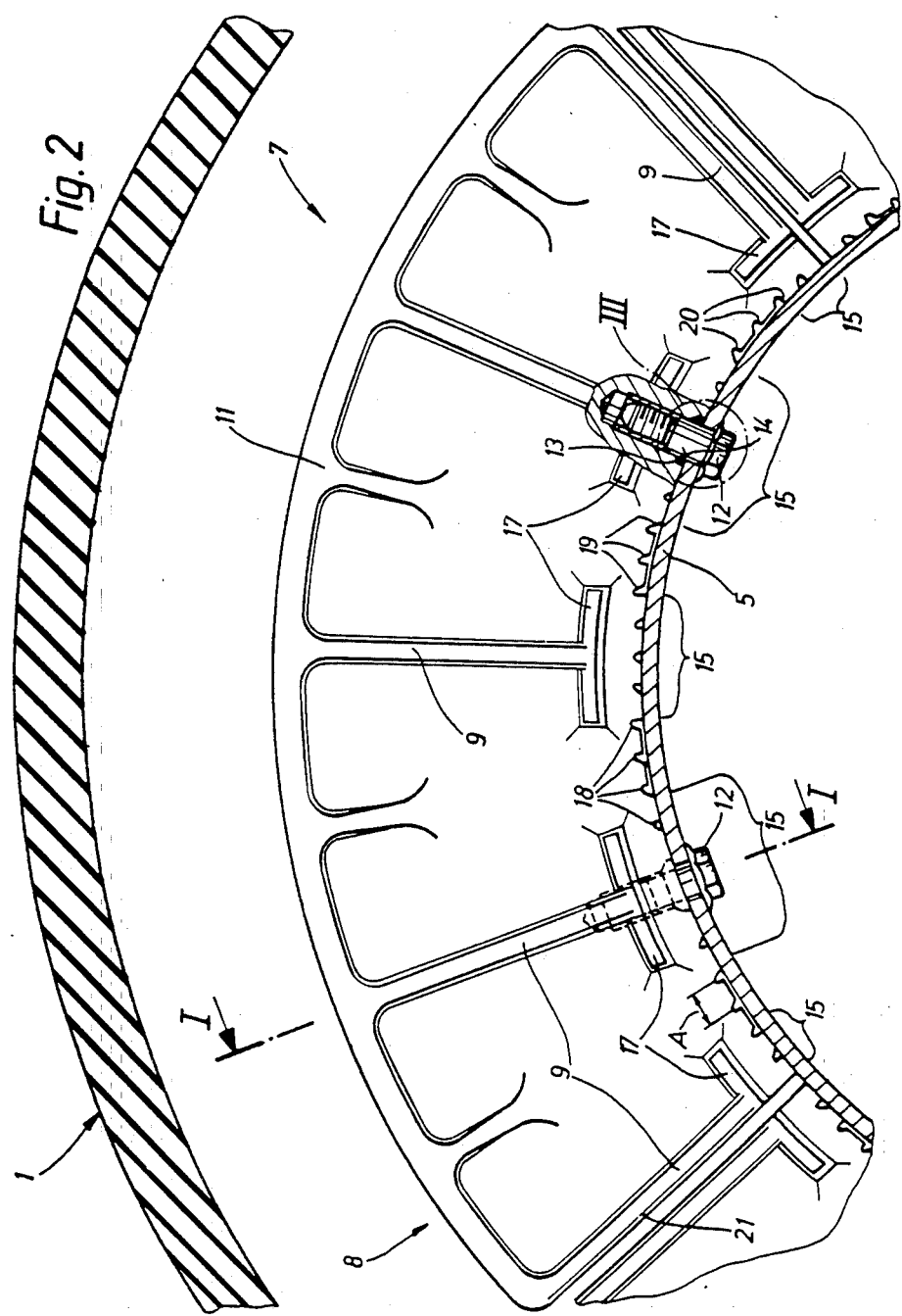
FIG. 2 is a cross-sectional view taken along lines 2'-2' of FIG. 1.

Referring to FIG. 2, in order to increase the rigidity of fastening of the individual segments in the well-base channel in spite of the relatively narrow fastening base, two clamp screws 12 are provided for each segment, so that each segment is fixed against circumferential skewing solely by the screws and the positive connection thereby achieved. A support point 15 is provided in the immediate region of each clamp screw 12 and at the end faces of the segments and also in the median region; between which a cavity is provided in each case, in which the inside of the segment does not contact the bottom of the well-base channel. A reliable contact of the segments with the rim is achieved by virtue of such a narrow support. In order to widen the contact base axially and to improve the edges, support brackets 17 are also formed laterally on each segment in the region of the stiffening ribs 9, which are braced against the rim base at the side of the well-base channel 5. These support brackets 17 are in contact with the same points of the circumference as the support points 15.

Before the individual segments are screwed they occupy an undefined circumferential position loosely inside the rubber tire. In order to facilitate the circumferential alignment of at least the first segment with the passage bores 14 by means of a relatively simple tool, the segments are provided with axially oriented grooves 18 at locations spaced from the threadbores 14, the mutual circumferential interval A of which grooves 18 is somewhat smaller than the diameter of the passage bore 14. It is thereby possible by means of a screwdriver or the like introduced through the passage bore 14, to displace the segments tooth by tooth in the circumferential direction until the screw threaded bore of the segment foot 10 coincides circumferentially with a passage bore 14. In order to facilitate this circumferential levering-on, and also to permit detection of the direction in which a segment can most conveniently be displaced, from the outside through the passage bore in a simple manner, the lateral flanks of the grooves located closest to a screw threaded bore are inclined toward the screw threaded bore 24 in each case, whereas the respective other lateral flanks stand at right angles to the inside of the segment foot. Consequently, a segment can be levered on in the circumferential direction until the screwdriver occupies an oblique position in the respective appropriate locating groove 18.

The assembly operation of the emergency wheel is as follows. First of all the tire is mounted with one bead over the upper rim clinch. The other bead is raised axially and the emergency segments are introduced individually radially into the interior of the rubber tire, the sealing loop-rings 13 having previously been preassembled in simple manner into the countersunk sections 22/relief sections 23 of the segments. Then the second bead is also drawn over the relevant rim clinch. The emergency segments can then be aligned in the circumferential direction in the manner described above using a screwdriver and the passage holes, which passage holes have circumferentially precisely the same mutual intervals, so that a maximum displacement of only half a screw interval is required. Since the loop-ring seal elements have already been correctly positioned, it is now only necessary to introduce and tighten the clamp screws 12, whereby the segments are fastened firmly and air-tightly to the circumference of the well-base rim. Only a single segment needs to be aligned in the circumferential direction with the passage bores; the remaining segments being automatically brought along to an approximate alignment in the circumferential direction.

In practical embodiments, the individual segments 8 have not been cut or otherwise machined on the outside of their circumference, and relatively wide casting tolerances may be present. In order to avoid a highly abrasive shock or offset at the transition points between two adjacent segments caused by such tolerance deviations, the segment heads 11 at these joint positions are provided both on the circumferential side and in the region of the lateral edges with a rounding in the direction of the end face 21 of the segments, whilst the radius of curvature corresponds approximately to the wall thickness of the segments. This not only avoids sharp-edged joints, but also simultaneously creates housing pockets for the abraded material, to further facilitate gentle and quiet emergency running in the case of a flat rubber tire.

Following are brief summaries of certain advantages of the emergency wheel constructed in accordance with the invention. Wheel assembly is facilitated due to free mobility of the as yet unfitted segments inside the tire, due to small angular deviations between the screw threaded bores and the passage holes, and due to the fact that the sealing loop-rings can be easily pre-assembled before inserting the segments in the tire. An additional assembly outlay of at most approximately a quarter of an hour for the emergency wheel may be calculated for each vehicle wheel. The assembly can be made using standard tires and rims, which need only be provided additionally with passage bores 14. Substantially no greater out-of-balance weights are required than for tires without emergency wheels. The emergency wheel segments are preferably pre-selected based on weight and/or pre-balanced to facilitate the balancing process, however this is not generally essential. The wheel assembly requires minimum maintenance and exhibits high reliability even after long periods in normal service. It is possible to re-use the emergency segments after emergency running. There are low unsprung masses in the vehicle wheel in normal service in spite of the installation of the emergency wheel. The assembly exhibits adequate springing comfort in emergency running and no restriction of travelling comfort in normal service. There is only a slight lowering of the tire onto the emergency segment after a tire puncture, therefore the low-lying vehicle parts are protected. The wheel assembly assures absorption of high transverse force stresses by the emergency wheel in emergency running. There is little or no wearing down of the tire at the rim or of the tire beads at the rim clinches during emergency running caused by the emergency segments. There is a high running performance during emergency running due to low friction values between cast aluminum and tire rubber. The useful life can be prolonged by hard anodising at least the tread surface of the segment head, or by coating it with polytetrafluoroethylene.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A vehicle wheel arrangement comprising a wheel rim formed to include a pair of radially outwardly facing tire support surfaces, the tire support surfaces being situated in axially spaced apart relation one to another, and a rim channel therebetween, the rim channel being formed to include at least one bolt-receiving aperture, an inflatable vehicle tire including an interior surface and tire bead means for engaging the tire support surfaces in sealing relation, a plurality of emergency wheel segments including foot means for engaging the rim channel to permit each wheel segment to be attached to the wheel rim and head means for engaging a portion of the interior surface of the vehicle tire during deflation thereof, the foot means being formed to include at least one bore for receiving a threaded bolt and seal retaining recess means for retaining a resilient sealing ring at an outer edge of each bore to permit preassembly of the sealing ring to accommodate subsequent assembly of each wheel segment to the wheel rim, said seal retaining recess means including a relief section means for retaining the sealing ring means in position on the segments during assembly, said relief section means including segment portions extending radially inwardly of the maximal radial width of the sealing ring means to overlap and retain the sealing ring means in position, and attachment means for detachably attaching each wheel segment to the wheel rim, the attachment means including a threaded bolt for sequential reception in the bolt-receiving aperture, the resilient sealing ring, and the wheel segment bore to attach rigidly a companion emergency wheel segment in a mounted position on the wheel rim.

2. The vehicle wheel arrangement of claim 1, wherein the tire bead means includes a pair of bead rings, each bead ring engaging one of the tire support surfaces to separate the bead rings in axially-spaced relation, the spaced-apart bead rings and the attached emergency wheel segments cooperating to define a pair of annular spaces to permit sliding movement of the bead rings toward one another to facilitate collapse of the vehicle tire during emergency running conditions caused by deflection of the vehicle tire.

3. The vehicle wheel arrangement of claim 2, wherein the foot means includes an annular radially inwardly facing wheel rim-engaging surface formed to include a plurality of circumferentially spaced, axially-extending adjustment accommodating grooves for receiving an adjustment tool so that the adjustment tool is advanceable through the bolt-receiving aperture of the rim channel to engage the wheel segment adjustment accommodating grooves to permit a tool-user to move a wheel segment relative to the wheel rim to position the wheel segment in a proper attachment position within the rim channel while the wheel segment is contained inside the vehicle tire.

4. The vehicle wheel arrangement of claim 1, wherein the inside of each segment foot means includes, on its circumference outside the region of the bolt-receiving bores, adjustment accommodatiing grooves the mutual interval of which is equal to or less than the diameter of the bolt-receiving apertures.

5. The vehicle wheel arrangement according to claim 4, wherein the adjustment accommodating grooves are axially oriented and are disposed over substantially the entire circumference of the segment foot means outside the region of the bores, and wherein a first lateral flank of each of the grooves located closest to a bolt-receiving bore is inclined toward the bore and another lateral flank stands at right angles to a radially inwardly-facing, wheel rim-engaging surface of the foot means.

6. The arrangement according to claim 1, wherein the segment foot means is wider in one axial direction than the other with respect to a transverse center plane of the wheel to accommodate a corresponding shape of the wheel rim.

7. The arrangement according to claim 1, wherein said wheel segments are fixedly maintained in position on the wheel rim independently of any spring means.

8. A vehicle wheel arrangement comprising a wheel rim formed to include a pair of radially outwardly facing tire support surfaces, the tire support surfaces being situated in axially spaced-apart relation one to another, and a rim channel therebetween, the rim channel being formed to include at least one bolt-receiving aperture, an inflatable vehicle tire including an interior surface and tire bead means for engaging the tire support surfaces in sealing relation, a plurality of emergency wheel segments wherein each wheel segment is formed to include at least one bore for the reception of a threaded clamp screw and a frusto-conical radially inwardly flared countersunk section at an outer edge of the bore, sealing means for providing an airtight seal between the rim and the clamp screws on the wheel segment contact side of the rim, said sealing means include a loop-ring formed of rubber elastic material and positioned in the countersunk section of the wheel segment wherein the countersunk section includes a relief for retaining the loop-ring such that it overlaps the maximum radial width of the loop-ring radially inwardly, said plurality of emergency wheel segments including foot means for engaging the rim channel to permit each wheel segment to be attached to the wheel rim and head means for engaging a portion of the interior surface of the vehicle tire during deflation thereof, the foot means including an annular radially inwardly facing wheel rim-engaging surface formed to include a plurality of circumferentially-spaced, adjustment accommodating grooves for receiving an adjustment tool so that the adjustment tool is advanceable through the bolt-receiving aperture of the rim channel to engage the adjustment accommodating grooves to permit a tool-user to move a wheel segment relative to the wheel rim to position the wheel segment in a proper attachment position within the rim channel while the wheel segment is contained inside the vehicle tire.

9. The vehicle wheel arrangement of claim 8, further comprising attachment means for detachably attaching each wheel segment to the wheel rim.

10. The vehicle wheel arrangement of claim 8, wherein the tire bead means includes a pair of bead rings, each bead ring engaging one of the tire support surfaces to separate the bead rings in axially-spaced relation, the spaced-apart bead rings and the attached emergency wheel segments cooperating to define a pair of annular spaces to permit sliding movement of the bead rings toward one another to facilitate collapse of the vehicle tire during emergency running conditions caused by deflation of the vehicle tire.

11. The arrangement according to claim 8, wherein the adjustment accommodating grooves are axially oriented and are disposed over substantially the entire circumference of the segment foot means outside the region of the bores, and wherein a first lateral flank of each of the grooves located closest to a bolt-receiving bore is inclined toward the bore and another lateral flank stands at right angles to the wheel rim-engaging surface of the segment foot means.

* * * * *

UNITED STATES PATENT AND TRADEMARK OFFICE
CERTIFICATE OF CORRECTION

PATENT NO. : 4,572,260

DATED : February 25, 1986

INVENTOR(S) : Armin Ordu

It is certified that error appears in the above-identified patent and that said Letters Patent is hereby corrected as shown below:

Column 2, line 15, change "detactable" to --detectable--

Column 3, line 4, change "Particulrly" to --Particularly--

Column 7, line 62, change "deflection" to --deflation--

Signed and Sealed this

Fifteenth Day of July 1986

[SEAL]

Attest:

DONALD J. QUIGG

Attesting Officer

Commissioner of Patents and Trademarks